Figure 1:
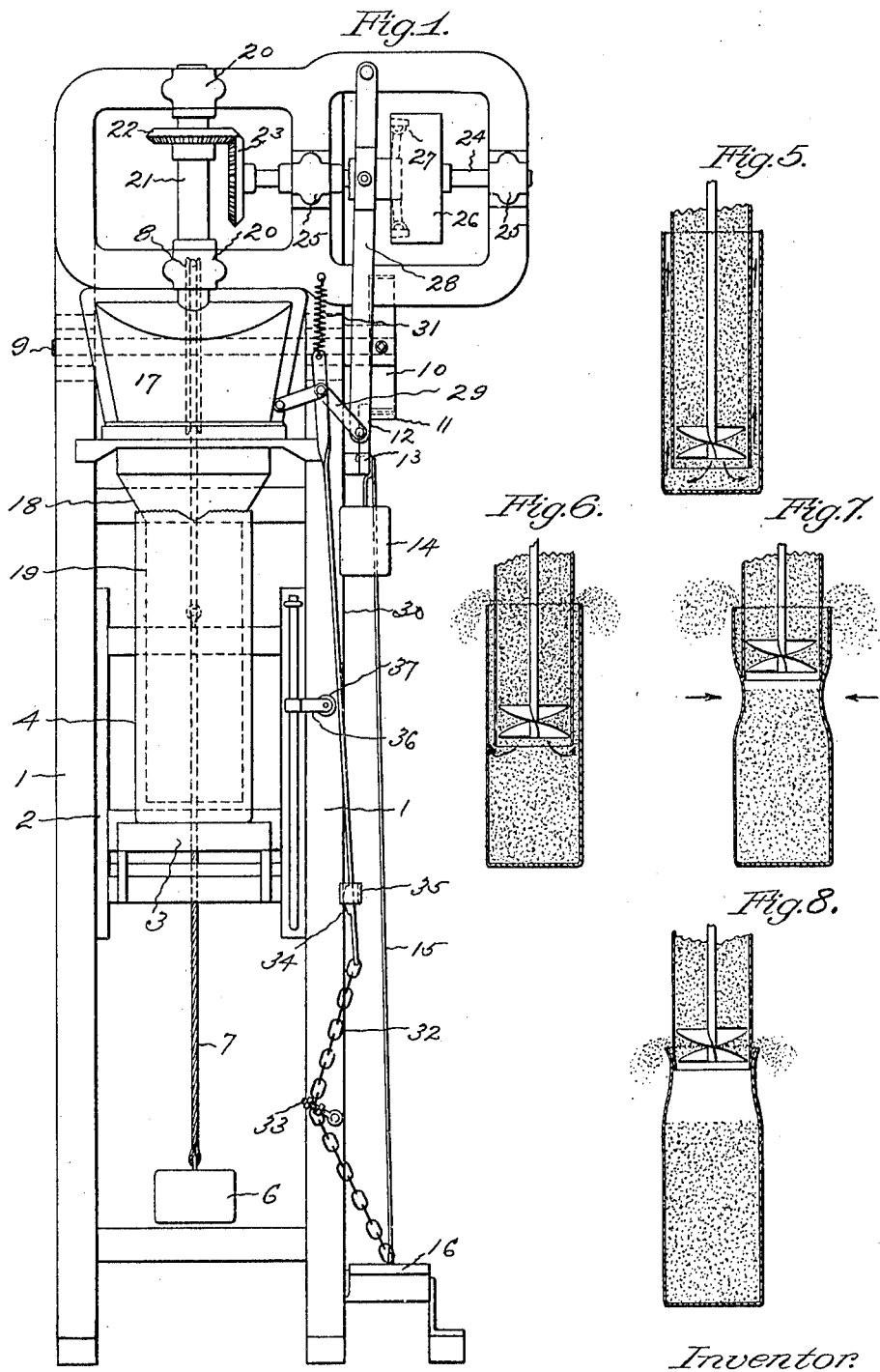

J. MERRITT.
FLOUR PACKING MACHINE.
APPLICATION FILED AUG. 18, 1908.

949,240.

Patented Feb. 15, 1910.

3 SHEETS—SHEET 1.

J. MERRITT.
FLOUR PACKING MACHINE.
APPLICATION FILED AUG. 18, 1908.

949,240.

Patented Feb. 15, 1910.
3 SHEETS—SHEET 2.

Witnesses:
C. F. Storrs
Josephine M. Strempfer

Inventor.
Joseph Merritt
per Harry P. Williams
Attorney.

J. MERRITT.
FLOUR PACKING MACHINE.
APPLICATION FILED AUG. 18, 1908.
949,240.
Patented Feb. 15, 1910.
3 SHEETS—SHEET 3.
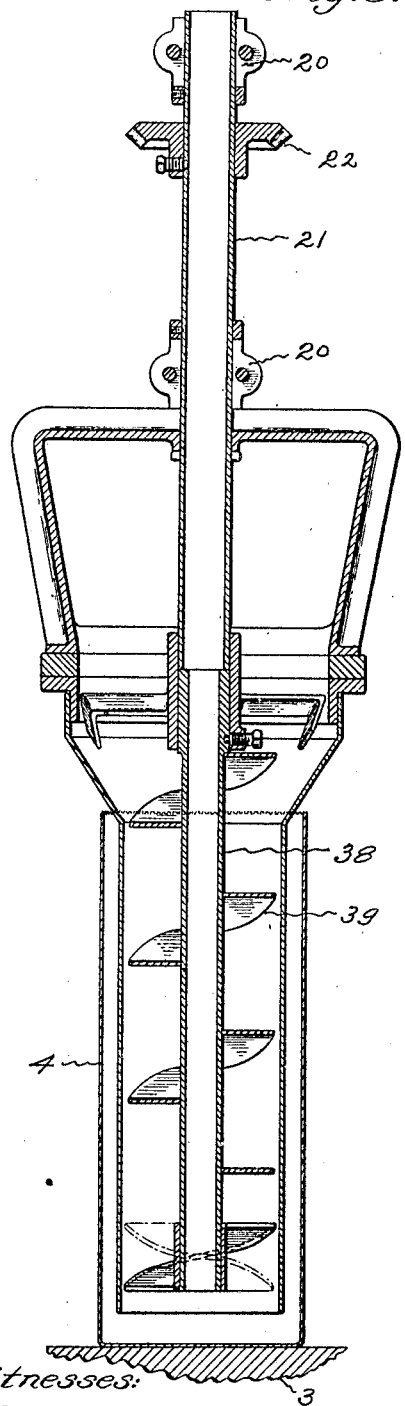
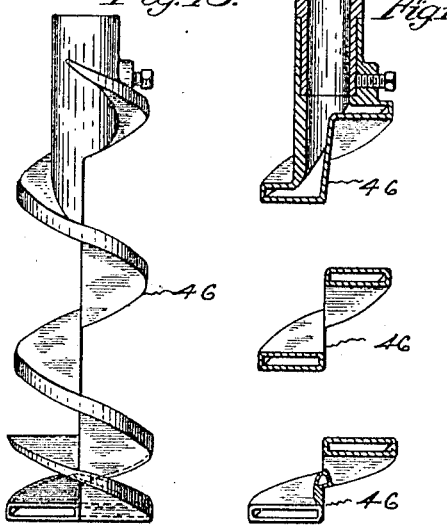
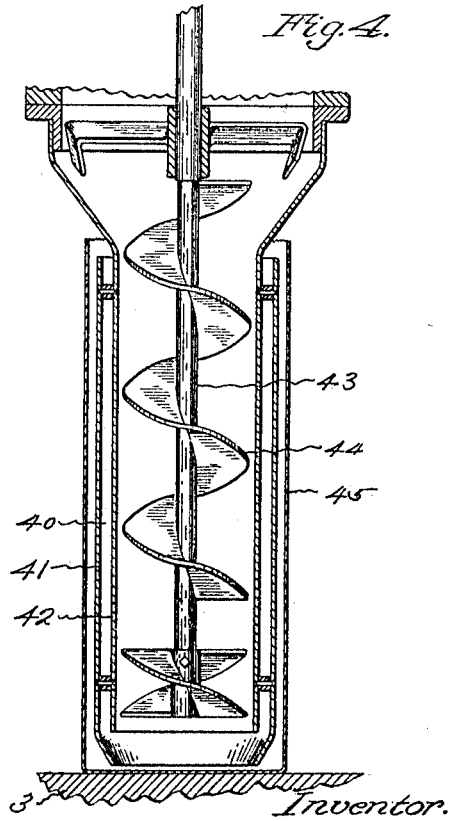
Witnesses:
C. H. Storrs.
Josephine M. Strempfer.
Inventor.
Joseph Merritt
per
Harry P. Williams
Attorney.

UNITED STATES PATENT OFFICE.

JOSEPH MERRITT, OF HARTFORD, CONNECTICUT.

FLOUR-PACKING MACHINE.

949,240.  Specification of Letters Patent.  Patented Feb. 15, 1910.

Application filed August 18, 1908. Serial No. 449,009.

*To all whom it may concern:*

Be it known that I, JOSEPH MERRITT, a citizen of the United States, residing at Hartford, in the county of Hartford and State of Connecticut, have invented a new and useful Flour-Packing Machine, of which the following is a specification.

This invention relates to a machine which is particularly adapted for packing flour into paper sacks, but which also is serviceable for packing ground, crushed or whole seeds, cereals, grains, sugar, cement, lampblack, graphite, and other powdered, pulverized, flocculent and granular substances into flexible and rigid sacks, bags, kegs, barrels, boxes and packages of various forms and sizes made of paper, woven fabric, wood, metal and other materials.

The object of the invention is to provide a comparatively simple, inexpensive and rapidly operating machine which will deposit and pack into a sack or other receptacle of paper or other material, powdered, pulverized, granular or flocculent substances without causing during filling, what is technically known as "boiling," that is, the flowing or blowing of some of the substance being packed out of the top of the receptacle as a result of the outflow and escape of air forced from and displaced by the substance as it is packed, and without causing what is know as "collapse" and "fluffing," that is, without causing the receptacle to collapse or contract so that it clings to the filling spout and spills the substance when the receptacle is removed from the spout, which in the prior machines much retards the speed of operation and causes great waste of the substance, unless the spilled substance is gathered up, which is unsanitary and requires additional labor, besides filling the atmosphere with dust, which is disagreeable and unhealthy for the operative and an element of danger to the plant.

The present invention resides in a machine having means for depositing and packing a powdered, pulverized, flocculent or granular substance in a paper sack or other receptacle, and means which allows the ready outflow of the air forced from and displaced by the substance as it is packed into the receptacle so as to eliminate "boiling" and provides for the free inflow of air when the receptacle and packing apparatus are separated, so as to provide against "collapse" and eliminate "fluffing."

Figure 2:
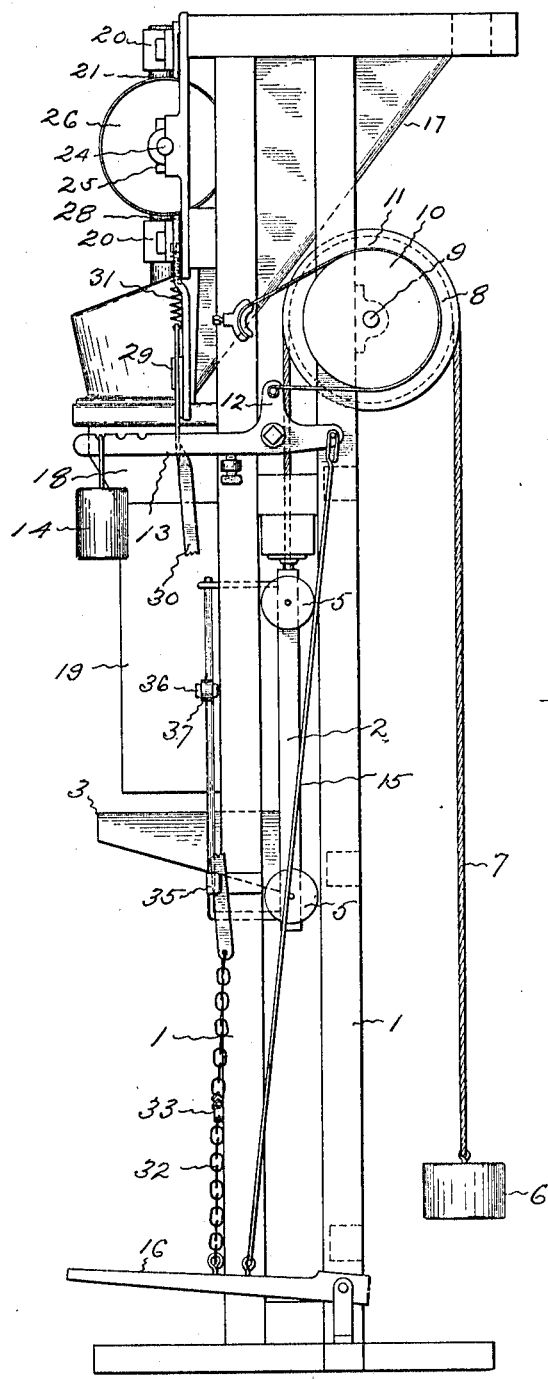
Figure 9:
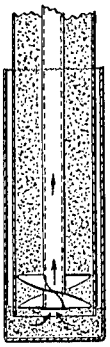
Figure 10:
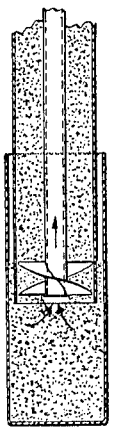
Figure 11:
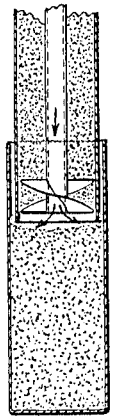
Figure 12:
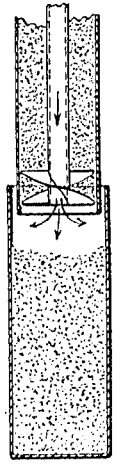

Figure 1 of the accompanying drawings shows a front elevation of a machine which embodies this invention with a sack in filling position. Fig. 2 shows a side elevation of the same machine without a sack. Fig. 3 shows a central vertical section on somewhat larger scale, of a sack and the packing means. Fig. 4 shows a similar section of a sack and a packing means provided with a modified form of air duct for the prevention of "boiling" and "fluffing." Fig. 5 is a sectional view illustrating the flow of flour at the beginning of packing into a sack by the prior form of packing machine. Fig. 6 is a sectional view illustrating the "boiling" action of flour being packed by the prior machine. Fig. 7 is a section illustrating the action caused by the prior machine known as "collapse" of the sack and "fluffing" of the flour when the sack commences to be withdrawn from the packing spout. Fig. 8 is a section illustrating the same action when the sack is nearly withdrawn from the packing spout. Fig. 9 is a sectional view illustrating the flow of flour when a sack is beginning to be packed by a machine which embodies this invention. Fig. 10 is a similar view showing the action when the sack is partly filled. Fig. 11 is a similar view when the sack is substantially filled. Fig. 12 is a similar view showing the action when the sack is completely filled and is being separated from the packing spout. Fig. 13 shows a modified form of packing worm. And Fig. 14 shows a central vertical section of the modified form of packing worm shown in Fig. 13.

The frame of the machine shown has upright supports 1 which may be made of wood or metal as desired, and movable vertically between these supports is a gate 2 which is provided with a platform 3, upon which the sack 4 or other receptacle to be filled is placed. The gate which carries this platform is guided in its movements up and down by wheels 5 which travel between the upright supports on each side, as shown in Fig. 2. This gate is connected with a counter-balancing weight 6 by a rope or cable 7, which is wound around a pulley 8 that is fastened on a horizontal shaft 9 mounted in bearings secured to the frame uprights.

The weight of this counter-balance is sufficient to cause the gate and platform with an empty sack, when not otherwise held, to be lifted so the filling spout will project into the sack.

Fastened on the shaft bearing the counter-balance pulley is a drum 10 about which passes a friction band 11 that is connected with the arm 12 of a lever 13, movable along which is a friction weight 14. Under normal conditions the friction band is drawn by its lever and weight sufficiently tight to bind the drum and hold the shaft and counter-balance pulley so that the counter-balance weight will not lift the gate and platform, in fact the friction and counter-balance weight are sufficient to support the gate, platform and a filled sack on the platform. A rod 15 connects an end of the friction lever with a treadle 16 that is mounted near the floor convenient to the foot of the operative. This connection is so made that when the treadle is depressed the friction band is loosened and the drum released so that the counter-balance weight will raise the gate and platform with an empty sack.

Mounted at the top of the frame is a hopper 17 into which the flour or other substance to be packed into the sack or other package is allowed to flow. This hopper may be formed of galvanized iron or any other suitable material, and attached to its lower end is an outlet which has a tapering head 18 and preferably a cylindrical spout 19 that is a little smaller in diameter than the sack to be filled. This spout may be any convenient length, and in fact could be omitted if desired. When the platform is raised by the counter-balance the upper edge of the sack or other receptacle may be engaged with the tapering head of the outlet from the hopper so that the mouth is closed, but it is preferred to leave the mouth of the receptacle open for the escape of air, which, with the present invention is accomplished without blowing out any of the substance being filled.

Supported vertically by bearings 20 at the top of the frame is a shaft 21 which is provided with a bevel gear 22, in mesh with which is a bevel gear 23 on a shaft 24 that is supported horizontally by bearings 25 secured to the top of the frame. Loosely mounted on the horizontal shaft is a driving pulley 26 which is adapted to be connected with the shaft by means of a clutch 27. This clutch is designed to be actuated for connecting and releasing the driving pulley with the horizontal shaft by a lever 28 that is pivoted to the top of the frame and that is swung back and forth by a toggle 29 which is opened and closed by a rod 30. This rod is raised by a spring 31 and is drawn down by the foot treadle with which the rod is connected by a chain 32. When the treadle is depressed, the rod is drawn down, the toggle straightened, and the clutch lever moved sidewise so as to cause the clutch to connect the horizontal shaft with the driving pulley, and then of course by this mechanism the vertical shaft is rotated. (Fig. 1). The chain which connects the clutch rod with the treadle is so connected with a rocker arm 33 that it tends to pull the lower end of the rod sidewise when drawn downward. Near the lower end the rod is provided with a shoulder 34 which when engaged with a lug 35 on the frame holds the rod in its lowest position. Adjustably attached to the platform gate is an arm 36 provided with a roll 37, which roll when the gate reaches the lowest desired position engages the shoulder and pushes the lower end of the rod so as to disengage the shoulder from the catch lug and allow the spring to draw the rod up and bend the toggle and so swing the clutch lever that the clutch releases the horizontal shaft from the driving pulley (Fig. 1).

In one form of the invention illustrated the vertical driving shaft is tubular, and coupled to the lower end of the driving shaft is a tubular shaft 38 provided with a screw or worm conveyer 39 which is approximately the diameter of the cylindrical outlet spout. When the clutch is thrown in and the vertical shaft is rotated, the worm forces flour or other substance from the outlet spout and packs it into the sack on the platform beneath. As the flour is packed into the sack by this means the platform is forced downwardly until the sack is filled to the desired level, the counterbalance weight and friction being adjusted to permit this, then the arm on the gate engages the shoulder on the clutch rod and causes the clutch to release the driving mechanism. After this the friction band is released from the friction pulley by lifting the friction lever, and the weight of the platform and the flour in the sack being sufficient causes the platform and sack to descend from the packing apparatus so that the packed sack can be removed. If desired, the platform could be stationary and the filling spout made movable for the purpose of permitting the removal of a packed sack.

Such substances as flour carry a rather large quantity of air as they flow down through a packer, and as the substances are packed into the sacks solidly this air is displaced and expelled. In the prior machines of this type now in use, as the substance is packed in the sack the air that is expelled escapes around the outside of the filling spout, and in thus escaping carries light particles of the substance up around the outside of the filling spout as indicated in Fig. 5, and fills this space in the sack around the spout faster than the main body of the sack. When the space outside of the spout becomes full the substance overflows, or as it is termed "boils out", as illustrated in Fig. 6, and becomes wasted unless it is gathered from the floor, which is an uncleanly act and takes time and labor. Furthermore, when a sack is dropped from the filling spout of the prior machine, the substance in the space about the spout forms a packing and a suction results which causes the sides of the sack to collapse so that it closes against and clings to the spout, with the result that the sack drops slowly and the substance in the space above the collapsed portion is drawn up as the sack descends and overflows its mouth, as indicated in Fig. 7. This forms a packing about the mouth of the spout so that the continued descent of the filled sack is slow and quite a little of the substance overflows, or as it is termed, "fluffs out" and is wasted, as indicated in Figs. 7 and 8.

In a packing machine provided with my improvement, the air which is expelled from the inflowing substance as it is packed, from the beginning, as indicated in Fig. 9 can flow upwardly through the hollow shaft so that it does not cause the substance to fill the space about the outside of the spout and overflow or "boil" and waste. This effect continues, as indicated in Fig. 10, until the sack is filled to the desired level. When the sack is dropped from the filling spout, air flows inwardly through the hollow shaft, as indicated in Figs. 11 and 12 until the level of the substance in the sack is below the mouth of the spout. This relieves all suction and eliminates any tendency of the sack to "collapse" and the substance to "fluff", draw or blow out of the mouth of the sack and become wasted, as it is removed from the spout.

In the form shown in Fig. 4 a duct 40 for the outflow of air expelled when the sack is packed is provided by arranging a tubular casing 41 about the filling spout 42. With this arrangement the shaft 43 with the worm 44 may or may not be solid for air can pass upwardly between the casing and the spout, when the substance is being packed into the sack 45, and downwardly when the sack is being removed from the spout.

If desired, as indicated in Figs. 13 and 14, the worm 46 may be made hollow and the upper end of the hollow worm connected with a hollow or solid shaft to provide for the outflow of air and thus eliminate "boiling", and for the inflow of air to eliminate "fluffing."

The invention claimed is:

1. A packing machine having a filling spout, a tubular shaft extending into the spout and open at its lower end at the bottom of the spout and at its upper end above the top of the spout, whereby a free flow of air is permitted through the shaft to and from the bottom of the spout, means for holding said shaft from longitudinal movement, a gear mounted on the tubular air shaft for rotating said shaft, and a packing worm mounted on said shaft in said spout.

2. A packing machine having a platform for supporting a sack, a filling spout, a tubular shaft extending into the spout and open at its lower end at the bottom of the spout and at its upper end above the top of the spout, whereby a free flow of air is permitted through the shaft to and from the bottom of the spout, means for holding said shaft from longitudinal movement, a gear mounted on the tubular air shaft for rotating said shaft, and a packing worm mounted on said shaft in said spout.

3. A packing machine having a vertically movable platform for supporting a sack, means for elevating said platform, a filling spout located above the platform, a tubular shaft extending into the spout and open at its lower end at the bottom of the spout and at its upper end above the top of the spout, whereby a free flow of air is permitted through the shaft to and from the bottom of the spout, means for holding said shaft from longitudinal movement, a gear mounted on said tubular air shaft for rotating said shaft, and a packing worm mounted on said shaft in said spout.

4. A packing machine having a vertically movable platform, a counter-balance connected with the platform and adapted to resist the downward movement of the platform while the receptacle thereon is being packed, a filling spout above the platform, a tubular shaft extending into the spout and open at its lower end at the bottom of the spout and at its upper end above the top of the spout, whereby a free flow of air is permitted through the shaft to and from the bottom of the spout, means for holding said shaft from longitudinal movement, a gear mounted on the tubular air shaft for rotating said shaft, and a packing worm mounted on said shaft in said spout.

5. A packing machine having a filling spout, a tubular shaft extending into the spout and opening at its lower end into the spout, and at its upper end above the top of the spout, whereby a free flow of air is permitted through the shaft to and from the spout, means for holding said shaft from longitudinal movement, means mounted on the tubular air shaft whereby said shaft may be rotated, and a packing worm removably attached to said shaft without obstructing the air passage therethrough.

JOSEPH MERRITT.

Witnesses:
D. B. WESTIN,
CHARLES H. STORRS.